United States Patent
Furuta et al.

[11] Patent Number: 5,559,184
[45] Date of Patent: Sep. 24, 1996

[54] THERMOPLASTIC RESIN COMPOSITIONS COMPRISING AMINOMETHYL SUBSTITUTED POLYPHENYLENE ETHERS

[75] Inventors: Motonobu Furuta, Chiba; Takanari Yamaguchi, Tsukuba, both of Japan

[73] Assignee: Sumitomo Chemical Company, Limited, Osaka, Japan

[21] Appl. No.: 257,289

[22] Filed: Jun. 9, 1994

[30] Foreign Application Priority Data

Jun. 10, 1993 [JP] Japan .................... 5-138395

[51] Int. Cl.$^6$ .................... C08L 23/12; C08L 71/12
[52] U.S. Cl. .................... 525/68; 525/397
[58] Field of Search .................... 525/68, 397

[56] References Cited

U.S. PATENT DOCUMENTS

| | | | |
|---|---|---|---|
| 4,670,537 | 6/1987 | White | 525/397 |
| 4,831,087 | 5/1989 | Brown | 525/397 |
| 5,068,286 | 11/1991 | Campbell et al. | 525/68 |
| 5,132,373 | 7/1992 | Khouri et al. | 525/132 |
| 5,151,460 | 9/1992 | Yates, III et al. | 525/68 |
| 5,159,075 | 10/1992 | Phanstiel et al. | 544/218 |
| 5,162,448 | 11/1992 | Khouri et al. | 525/397 |
| 5,191,030 | 3/1993 | Ohmura et al. | 525/390 |
| 5,331,060 | 7/1994 | Aycock et al. | 525/397 |

FOREIGN PATENT DOCUMENTS

| | | |
|---|---|---|
| 0229498 | 7/1987 | European Pat. Off. . |
| 0308255 | 3/1989 | European Pat. Off. . |
| 0408255 | 1/1991 | European Pat. Off. . |
| 0493674 | 7/1992 | European Pat. Off. . |
| 0507966 | 10/1992 | European Pat. Off. . |
| 1247256 | 9/1971 | United Kingdom . |

*Primary Examiner*—Thomas Hamilton, III
*Attorney, Agent, or Firm*—Birch, Stewart, Kolasch & Birch, LLP

[57] ABSTRACT

A thermoplastic resin composition containing (A) 1 to 99% by weight of a modified polyphenylene ether comprising repeating units of the formula (1):

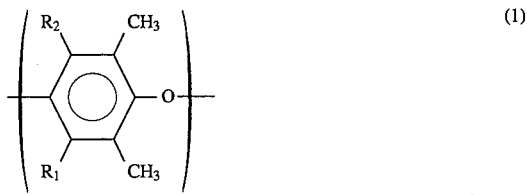

in which $R_1$ and $R_2$ are, independently from each other, a hydrogen atom or a hydrocarbon group having 1 to 20 carbon atoms and having a number average polymerization degree of 20 to 1200, in which 0.02/X to 1/X of methyl groups at the 2- and/or 6-positions of phenylene group are substituted by an aminomethyl group wherein X is a number average polymerization degree, and (B) 99 to 1% by weight of a polyolefin which is modified with a compound having a functional group reactive with an amino group in a molecule, which composition is excellent in heat resistance, melt flowability, processability and impact resistance, and provides an article having good appearance and gloss.

10 Claims, 2 Drawing Sheets

THERMOPLASTIC RESIN COMPOSITIONS COMPRISING AMINOMETHYL SUBSTITUTED POLYPHENYLENE ETHERS

BACKGROUND OF THE INVENTION

1. Field of the Invention

The present invention relates to a novel thermoplastic resin composition which is used in the production of a molded article by injection molding and extrusion molding.

2. Description of the Related Art

In general, a polyphenylene ether has excellent properties such as heat resistance, hot water resistance, dimensional stability, and mechanical and electrical properties, while it has some drawbacks such as poor moldability due to high melt viscosity, low chemical resistance and low heat impact resistance.

As a composition which improves the moldability by decreasing the melt viscosity while maintaining other good properties of the polyphenylene ether, there is known a composition comprising the polyphenylene ether and a polystyrene resin. However, the chemical resistance is not improved.

Since polyolefin is excellent in moldability, toughness, water resistance and chemical resistance, has a low specific gravity and is cheap, it is widely used as a raw material of various molded articles, a film or a sheet.

However, the polyolefin is insufficient in heat resistance, stiffness, impact resistance, coating properties or adhesion, or should be improved in such properties. This prevent new application of the polyolefin. In particular, improvement of the heat resistance and the impact resistance is highly desired.

In view of the above circumstances, it may be expected that a wide variety of new applications could be found if the polyphenylene ether and the polyolefin were compounded to give a resin composition having the good properties of the both polymers and improved moldability and impact resistance.

However, practically, the polyphenylene ether and the polyolefin have poor compatibility with each other even if they are compounded, so that, in a molded article produced by the injection molding, the polyphenylene ether and the polyolefin are phase separated, and the article has extremely poor appearance and deteriorated mechanical properties and cannot be used practically.

To improve the compatibility between the polyphenylene ether and a propylene polymer, for example, EP-A-329 423 discloses the use of a propylene polymer to which a styrene monomer is graft polymerized in combination with the polyphenylene ether.

EP-A-329 423 discloses that a composition having good heat resistance and mechanical properties is obtained by compounding the propylene polymer to which styrene or a mixture of styrene and a monomer copolymerizable with styrene is grafted or a rubber in the polyphenylene ether. Japanese Patent KOKAI Publication No. 173137/1990 discloses a resin composition comprising polyolefin having an amino group and a polyphenylene ether having a polar group.

Further, Japanese Patent KOKAI Publication No. 1489/1991 discloses a resin composition comprising a modified polyphenylene ether to which a mixture of a styrene monomer and an amino group-containing monomer is grafted and polypropylene having a functional group.

When one of the above resin compositions is used, a molded article is not necessarily satisfactory in impact resistance, heat resistance, moldability, elongation or chemical resistance. Therefore, in some applications, the use of such composition is difficult. In addition, the preparation of the composition itself is not necessarily easy, or the composition is expensive. Therefore, the market requires a cheap composition having improved properties.

SUMMARY OF THE INVENTION

An object of the present invention is to provide a thermoplastic resin composition which is excellent in heat resistance and mechanical strength and also in moldability and chemical resistance.

According to a first aspect of the present invention, there is provided a thermoplastic resin composition comprising (A) 1 to 99% by weight of a modified polyphenylene ether comprising repeating units of the formula (1):

wherein $R_1$ and $R_2$ are, independently from each other, a hydrogen atom or a hydrocarbon group having 1 to 20 carbon atoms and having a number average polymerization degree of 20 to 1200, in which $0.02/X$ to $1/X$ of methyl groups at the 2- and/or 6-positions of phenylene group are substituted by an aminomethyl group wherein X is a number average polymerization degree, and (B) 99 to 1% by weight of a polyolefin which is modified with a compound having a functional group reactive with an amino group in a molecule.

In a second aspect of the present invention, the thermoplastic resin composition of the present invention further comprises (C) a rubber like material in an amount of 1 to 100 parts by weight per 100 parts by weight of the total weight of the modified polyphenylene ether (A) and the polyolefin (B).

Preferably, the polyolefin is polypropylene.

The functional group reactive with the amino group may be an unsaturated dicarboxyl anhydride group.

DETAILED DESCRIPTION OF THE INVENTION

The component (A) in the thermoplastic resin composition of the present invention is a modified polyphenylene ether comprising repeating units in which a part of the methyl groups at the 2- and/or 6-positions of the phenylene groups are substituted with the aminomethyl groups (—$CH_2NH_2$). The repeating units substituted with the aminomethyl groups may be terminal repeating units, or may be present at intermediate positions of the backbone. In particular, the polyphenylene ether comprising the aminomethyl-substituted repeating units as the terminal units is preferred since it can be easily prepared.

The modified polyphenylene ether of the present invention is characterized in that 0.02/X to 1/X, preferably 0.05/X to 1/X of the methyl groups at the 2- and/or 6-positions of the phenylene group are substituted by the aminomethyl group wherein X is a number average polymerization degree.

When the number of the aminomethyl groups is less than 0.02/X of the methyl groups at the 2- and/or 6-positions of the phenylene groups, the heat resistance or the mechanical properties are not sufficiently improved when the modified polyphenylene ether is used as a component of the resin composition.

The modified polyphenylene ether of the present invention comprises 20 to 1200, preferably 30 to 1000 repeating units of the formula (1) on the number average. When the number of the repeating units of the formula (1) is less than 20, a glass transition temperature of the modified polyphenylene ether is too low so that the heat resistance of the composition, in particular, the deformation temperature under load is decreased. While this number exceeds 1200, the modified polyphenylene ether has a very high melt viscosity, so that the processability is deteriorated.

The process for preparing the modified polyphenylene ether of the component (A) will be explained.

One of the preferred processes comprises polymerizing a nucleus-substituted phenol of the formula (2):

(2)

wherein $R_3$, $R_4$ and $R_5$ are, independently from each other, a hydrogen or a hydrocarbon group having 1 to 20 carbon atoms using an oxidative coupling catalyst in the presence of an amine of the formula (3):

(3)

wherein $Q_1$ and $Q_2$ are, independently from each other, a hydrogen, an alkyl group having 1 to 24 carbon atoms or an aralkyl group having 7 to 24 carbon atom, provided that $Q_1$ and $Q_2$ are not simultaneously hydrogen atoms, or $Q_1$ and $Q_2$ are both alkylene groups and forms a ring, in an amount of 0.001 to 0.2 mole per one mole of the nucleus-substituted phenol, and melt kneading the resulting polyphenylene ether.

This process is explained more in detail. In the process for polymerizing the nucleus-substituted phenol of the formula (2) in the presence of the oxidative coupling catalyst, the polymerization is carried out in the presence of the amine of the formula (3). The amine is present in an amount of 0.001 to 0.2 mole, preferably 0.005 to 0.05 mole per one mole of the nucleus-substituted phenol. When the amount of the amine is less than 0.001 mole per one mole of the nucleus-substituted phenol, any polyphenylene ether having good properties is not obtained. When the amount exceeds 0.2 mole, any polyphenylene ether having a practical molecular weight cannot be obtained.

As described above, the polyphenylene ether having the amine on the side chains can be obtained.

Herein, the nuclei-substituted phenols of the formula (2) can be used independently, or as a mixture of two or more of the phenols.

Preferred examples of the nucleus-substituted phenol are 2,6-dimethylphenol, 2,3,6-trimethylphenol and the like. Among them, 2,6-dimethylphenol is particularly preferred.

Specific examples of the amine of the formula (3) are primary amines such as n-propylamine, isopropylamine, n-butylamine, isobutylamine, sec.-butylamine, n-hexylamine, n-octylamine, 2-ethylhexylamine, cyclohexylamine, laurylamine, benzylamine, etc.; and secondary amines such as diethylamine, di-n-propylamine, di-n-butylamine, diisobutylamine, dion-octylamine, piperidine, 2-pipecoline, etc. A polyamine which is regarded as having the amine of the formula (3) as a repeating unit is equivalent to the amine of the formula (3). Examples of such polyamine are ethylenediamine, piperazine, 1,3-dipiperidylpropane, and the like.

Specifically, it is preferred to use the amine of the formula (3) and a known catalyst system comprising a copper compound, a manganese compound or a cobalt compound and a ligand selected from bases.

There are exemplified a process comprising oxidation coupling the phenol monomer and oxygen in the presence of a catalyst comprising a manganese salt, a basic reaction medium and a secondary amine as disclosed in Japanese Patent KOKAI Publication No. 79993/1978; and a process for oxidation polymerizing the nucleus-substituted phenol with an oxygen-containing gas in an organic solvent in the presence of a catalyst comprising one or more divalent manganese salts, at least one base compound selected from the group consisting of an hydroxide, alkoxide or phenoxide of a metal of the IA group of the Periodic Table and a hydroxide or oxide of a metal of the IIA group, an alkanol amine and an amine as disclosed in Japanese Patent KQKAI Publication No. 54424/1988.

By the above process, the polyphenylene ether comprising the repeating units in which the methyl groups at the 2- and/or 6-positions of the phenylene group are changed to the group of the formula (4):

(4)

wherein $Q_1$ and $Q_2$ are the same as defined above can be obtained.

The above repeating unit to which the secondary or tertiary amine is bonded may be the terminal unit of the polyphenylene ether, or may be present in the intermediate of the backbone. In particular, the polyphenylene ether comprising the such repeating units as the terminal units is preferred since it can be easily prepared.

Then, the polyphenylene ether in which the methyl groups at the 2- and/or 6-positions of the phenylene groups are substituted by the secondary or tertiary amine is melt kneaded to obtain the modified polyphenylene ether used as the component (A) in the thermoplastic resin composition of the present invention.

The melt kneading is carried out at a resin temperature of 200° to 300° C., preferably 230° to 280° C. When the resin temperature is lower than 200° C., the molding processability of the raw material polyphenylene ether is not good, while when the resin temperature is higher than 300° C., the polyphenylene ether may be decomposed unpreferably.

For melt kneading, conventionally used kneading apparatuses such as single or twin screw extruders, various types of kneader and the like can preferably used.

The polyphenylene ether may be melt kneaded by adding a radical initiator during kneading. Alternatively, the radical initiator can be added to the polyphenylene ether and then melt kneaded. Preferably usable radical initiators include cumene hydroperoxide, tert.-butyl hydroperoxide, dimethyl-2,5-bis(hydroperoxy)hexane, 1,3-bis(tert.-butylperoxyisopropyl)benzene, tert.-butyl peroxide, 2,6-ditert.-butyl-4-methylphenol, and the like.

It is possible to confirm that the above obtained component (A) of the thermoplastic resin composition of the present invention is a modified polyphenylene ether having a primary amine group by extracting the modified polyphenylene ether or the polyphenylene ether from the composition with a solvent, precipitating it and quantifying the amine species in the extracted component by, for example, potentiometric titration.

To the modified polyphenylene ether as the component (A) of the thermoplastic resin composition of the present invention, unmodified polyphenylene ether, styrene-grafted polyphenylene ether, polystyrene and the like can be added, if desired.

Preferably, the modified polyphenylene ether as the component (A) of the thermoplastic resin composition of the present invention and the raw material polyphenylene ether therefor have a reduced viscosity $\eta_{sp}/c$ (measured at 25° C. with a chloroform solution of 0.5 g/dl) of 0.30 to 0.65 dl/g. When $\eta_{sp}/c$ is lower than 0.30 dl/g, the heat resistance of the composition is severely deteriorated, while when $\eta_{sp}/c$ exceeds 0.65 dl/g, the moldability of the composition is deteriorated.

The component (B) in the thermoplastic resin composition of the present invention is a polyolefin which is modified with a compound having a functional group reactive with an amino group in a molecule.

The polyolefin used in the present invention is a crystalline or amorphous olefin polymer. Specific examples of the polyolefin are homo- or copolymers of at least one olefin such as polypropylene, high density polyethylene, low density polyethylene, linear low density polyethylene, propylene-ethylene copolymer, ethylene-1-butene copolymer, ethylene-pentene copolymer, ethylene-hexene, poly-4-methylpentene-1, etc.; copolymers comprising a predominant amount of at least one olefin and at least one other vinyl monomer copolymerizable with the olefin(s) such as acrylate esters, methacrylate esters, vinyl acetate, styrene, acrylonitrile, glycidyl acrylate or methacrylate, and the like. The copolymer may be a random, block or graft copolymer. The polyolefin may be used independently or as a mixture of two or more of the polyolefins. Among them, polyethylene and polypropylene are preferred, and polypropylene and a random or block copolymer of propylene and ethylene are more preferred.

The polyolefin can be prepared by any of the well known methods, for example, the polymerization methods described in ENCYCLOPEDIA OF POLYMER SCIENCE AND TECHNOLOGY, Vol. 6, page 275 (1967) and Vol. 11, page 597 (1969) (John Wiley & Sons, Inc.), the disclosures of which are hereby incorporated by reference.

As the polypropylene, any of the conventional ones can be used. If desired, an ethylene-α-olefin copolymer which may be modified with styrene can be compounded in the polyolefin. The ethylene-α-olefin copolymer preferably has a density of 0.82 to 0.92 g/cm².

As the polypropylene, a highly crystalline propylene polymer may be used in necessary. The highly crystalline polymer intends to mean a propylene polymer in which isotactic pentad ratio of a part insoluble in boiling heptane in a homopolymer or a homopolymer segment which is a first segment polymerized in the first step of the block copolymer is 0.970 or larger, as described in Japanese Patent KOKAI Publication No. 247457/1989.

In a field where high stiffness is required, it is preferable to add a known nucleating agent to the propylene polymer.

Further, it is known that a polymer of a vinylcycloalkane having 6 or more carbon atoms effectively functions as a nucleating agent.

That is, a composition which is prepared by blending the polymer of the vinylcycloalkane having 6 or more carbon atoms as disclosed in Japanese Patent KOKAI Publication No. 234462/1989 in the propylene polymer and contains 0.05 to 10,000 wt. ppm of the vinylcycloalkane units in the composition is preferred, since it has high crystallinity.

By blending the vinylcycloalkane polymer in the highly crystalline propylene polymer, the propylene polymer having high stiffness is obtained.

The propylene polymers may be used independently or as a mixture of two or more of them.

The component (B) in the thermoplastic resin composition of the present invention is the modified polyolefin which is prepared by graft polymerizing a compound having a functional group reactive with an amino group on the above polyolefin.

As the modified polyolefin, there is exemplified a polymer prepared by reacting at least one compound selected from the following groups (a), (b) and (c) with the polyolefin.

(a) A compound having, in a molecule, (i) a carbon-carbon double or triple bond and (ii) a carboxyl group, an acid anhydride group, an acid amide group, an imide group, a carboxylate group, an isocyanate group, a methylol group, a group having an oxazoline ring or a hydroxyl group.

Specific examples are maleic anhydride, maleic acid, fumaric acid, maleimide, maleic hydrazide, a reaction product of maleic anhydride and a diamine such as a compound having a structure of the formula:

wherein R is an aliphatic or aromatic group, methylnadic anhydride, dichloromaleic anhydride, maleic acid amide, natural oils such as soy bean oil, tung oil, castor oil, linseed oil, hemp-seed oil, cotton seed oil, sesame oil, rape seed oil, peanut oil, tsubaki oil, olive oil, coconut oil and sardine oil; epoxidized natural oils such as epoxidized soy bean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic acid, 2,2-dimethyl-3-butenoic acid, 2-heptenotic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid erucic acid, tetracosenoic acid, mycolipenic acid, 2,4-pentadienoic acid, 2,4-hexadienoic acid, diallylacetic acid, geranium acid, 2,4-decadienoic acid, 2,4-dodecadienoic acid, 9,12-hexadecadienoic acid, 9,12-octadecadienoic acid, hexadecatrienoic acid, linoleic acid, linolenic acid, octadecatrienoic acid, eicosadienoic acid, eicosatrienoic acid, eicosatetraenoic acid, ricinoleic acid, eleostearic acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid and tetracontenoic acid or their esters, acid amides, anhydrides; unsaturated alcohols such as allyl alcohol, crotyl alcohol, methyvinylcarbinol, allylcarbinol, methylpropenylcarbinol, 4-penten-1-ol, 10-undecen-1-ol, propargyl alcohol, 1,4-pentadien-3-ol, 1,4-hexadien-3-ol, 3,5-hexadien-2-ol, 2,4-hexadien-1-ol, an alcohol represented by the formula: $C_nH_{2n-5}OH$, $C_nH_{2n-7}OH$ or $C_nH_{2n-9}OH$ wherein n is a positive integer, 3-butene-1,2-diol, 2,5-dimethyl-3-hexane-2,5-diol, 1,5-hexadiene-3,4-diol and 2,6-octadiene-4,5-diol or unsaturated amines consisting of these unsaturated alcohols in which an OH group is substituted with a $NH_2$ group; glycidyl acrylate, glycidyl methacrylate, allyl glycidyl ether, and the like.

Among them, maleic anhydride, fumaric acid, itaconic acid, hymic anhydride, glycidyl acrylate, glycidyl methacrylate and allyl glycidyl ether are preferred.

It is possible to use a compound having at least two functional groups from the group (i) and at least two functional groups which may be the same or different from the group (ii). Also, it is possible to use two or more compounds.

(b) a saturated aliphatic polycarboxylic acid or its derivative of the formula:

wherein

R is a linear or branched saturated aliphatic hydrocarbon group having 2 to 20 carbon atoms, preferably 2 to 10 carbon atoms, $R^1$ is a hydrogen atom, an alkyl group, an acyl group or a carbonyldioxy group having 1 to 10 carbon atoms, preferably 1 to 6 carbon atoms, more preferably 1 to 4 carbon atoms, in particular a hydrogen atom, or an aryl group having 6 to 20 carbon atoms, $R^2$ is a hydrogen atom or an alkyl group having 1 to 20 carbon atoms, preferably 1 to 10 carbon atoms or an aryl group having 6 to 20 carbon atoms, $R^3$ and $R^4$ are each a hydrogen atom or an alkyl group having 1 to 10 carbon atoms, preferably 1 to 6 carbon atoms, more preferably 1 to 4 carbon atoms, or an aryl group having 6 to 20 carbon atoms, m is 1, n+s is equal to or larger than 2, preferably 2 or 3, n is equal to or larger than 0, and s is equal to or larger than 0 and the ($R^1O$) group is present at an α- or β-position to the carbonyl group, and a pair of the adjacent carbonyl groups have 2 to 6 carbon atoms in total.

Examples of the derivative are esters, amides, anhydrides, hydrates and salts of the saturated aliphatic polycarboxylic acid. Examples of the saturated aliphatic polycarboxylic acid are citric acid, malic acid, agaricic acid and the like. Examples of the ester are acetyl ester and mono or distearyl ester of citric acid. Examples of the amide are N,N'-diethylamide, N,N'-dipropylamide, N-phenylamide, N-dodecylamide and N,N'-didodecylamide of citric acid and N-dodecylamide of malic acid.

(c) a compound of the formula:

wherein (X) is a group of the formula: [X'—CO]— in which X' is Cl, Br, I, OH, OR or —O—CO—$R^5$ ($R^5$ is a hydrogen atom, an alkyl group or an aryl group), (Y) is a carboxylic acid group, an acid anhydride group, an acid amide group, an imide group, a carboxylate ester group or a hydroxyl group, and (X) and (Y) are covalently bonded through a hydrocarbon group Z.

Specific examples are chloroformylsuccinic anhydride, chloroethanoylsuccinic anhydride, trimellitic anhydride, acetic anhydride, terephthalic acid chloride and the like.

Among the compounds (a) to (c) having the functional groups in the molecule, the unsaturated dicarboxylic anhydride is particularly preferred.

An amount of the compound (a) to (c) having at least one functional group in the molecule to be used for modification is from 0.01 to 20 parts by weight, preferably from 0.1 to 10 parts by weight based on 100 parts by weight of the polyolefin.

When the amount of this compound is less than 0.01 parts by weight, the thermoplastic resin composition of the present invention has insufficient mechanical properties. When this amount exceeds 20 parts by weight, the resin composition tents to be colored or have decreased flowability.

To react the polyolefin and the modifier compound, there are a process comprising reacting them in a well known solvent in the presence or absence of a radical initiator and a process comprising effectively reacting them in the absence of a solvent at a temperature at which the polyolefin is molten. Any process may be employed.

To improve the properties, in particular the impact resistance of the thermoplastic resin composition of the present invention, a rubber like material (C) may be added to the composition.

Herein, the rubber like material intends to mean a natural or synthetic polymer material which is elastic at room temperature.

Specific examples of the rubber like material are natural rubber, butadiene polymer, butadiene-styrene copolymer including random, block and graft copolymers, their hydrogenated derivatives, isoprene polymer, chlorobutadiene polymer, butadiene-acrylonitrile copolymer, isobutyrene polymer, isobutyrene-butadiene copolymer, isobutyrene-isoprene copolymer, acrylate copolymer, ethylene-α-olefin copolymer, styrene-isoprene copolymer or their hydrogenated derivatives, styrene-ethylene-butylene copolymer, styrene-butylene-copolymer, styrene-ethylene-propylene copolymer, perfluororubber, fluororubber, chloroprene rubber, butyl rubber, silicone rubber, ethylene-α-olefin-nonconjugated diene copolymer, Thiokol rubber, polysulfide rubber, polyurethane rubber, polyether rubber (e.g. propylene oxide, etc.), epichlorohydrin rubber, polyester elastomer, polyamide elastomer, epoxy group-containing copolymer and the like.

Herein, the epoxy group-containing copolymer intends to mean a copolymer comprising an unsaturated epoxy compound and an ethylenically unsaturated compound.

According to the first aspect of the present invention, the desired thermoplastic resin composition is obtained when the ratio of the component (A) to the component (B) is in the specific range. A composition of the components (A) and (B) is 1 to 99% by weight of the component (A) and 99 to 1% by weight of the component (B).

When the amount of the component (A) is less than 1% by weight, the resin composition has insufficient heat resistance. When it exceeds 99% by weight, some properties such as the processability and chemical resistance of the resin composition are insufficient.

In the resin composition of the present invention, preferably the component (A) forms a discontinuous phase while the component (B) forms a continuous phase. In such case, the resin composition of the present invention is excellent in chemical resistance and moldability, and the molded article of the resin composition has good appearance.

To obtain such morphology, the amounts of the components (A) and (B) are preferably 1 to 80% by weight and 99 to 20% by weight, respectively. More preferably, an amount of the component (A) is from 1 to 70% by weight, while that of the component (B) is from 99 to 30% by weight.

In the thermoplastic resin composition of the present invention, it is possible to add the unmodified polyphenylene ether to the modified polyphenylene ether as the component (A) and also to add the unmodified polyolefin to the modified polyolefins the component (B), if desired. The addition of the unmodified polyolefin is preferred, since the elongation is improved. In such case, the modified polyphenylene ether and the unmodified polyphenylene ether are well compatible with each other, while the modified polyolefin and the unmodified polyolefin are well compatible with each other.

In this case, for the same reason as above, preferably, the compatibilized polyphenylene ether part forms the discontinuous phase, while the compatibilized polyolefin part forms the continuous phase.

When the unmodified polyolefin is blended with the modified polyolefin (B) in the thermoplastic resin composition of the present invention, amounts of the components (A) and (B) and the unmodified polyolefin are preferably 1 to 90% by weight, 94 to 1% by weight and 5 to 98% by weight, respectively, more preferably, 1 to 80% by weight, 94 to 10% by weight and 10 to 89% by weight, respectively.

According to the second aspect of the present invention, the desired thermoplastic resin composition is obtained when the ratio among the component (A), the component (B) and the component (C) is in the specific range. Amounts of the components (A) and (B) are 1 to 99% by weight and 99 to 1% by weight, respectively, and an amount of the component (C) is from 1 to 100 parts by weight per 100 parts by weight of the total weight of the components (A) and (B).

When the amount of the component (C) is less than 1 parts by weight per 100 parts by weight of the total weight of the components (A) and (B), the effect of the addition of the rubber like material is only insufficiently achieved, while it exceeds 100 parts by weight, the heat resistance of the resin composition is greatly deteriorated unpreferably.

In the thermoplastic resin composition of the present invention, an inorganic filler may be optionally added to improve the properties of the molded article, in particular, stiffness and dimensional stability.

As the inorganic filler, calcium carbonate, talc, clay, silica, magnesium carbonate, barium sulfate, titanium oxide, alumina, gypsum and the like are exemplified. Among them, talc and calcium carbonate are preferred.

The inorganic filler preferably has an average particle size of 0.05 to 10 µm.

When the particle size is less than 0.05 µm, the dimensional stability and stiffness of the molded article are not materially improved. When the particle size exceed 10 µm, the surface gloss of the molded article is considerably deteriorated. As the inorganic filler, glass fiber may be used.

In addition to the above components, the thermoplastic resin composition of the present invention may optionally contain a melt flow improver.

As the melt flow improver, any of conventional ones may be used. Preferably, white oil, liquid paraffin, low molecular weight hydrocarbon resin, low molecular weight polyolefin, and the like are exemplified. Their modified products may be used also.

As the white oil, for example, one disclosed in Japanese Patent KOKAI Publication No. 238051/1990 and the like may be used.

The liquid paraffin is a material obtained by distilling a crude oil under atmospheric pressure or reduced pressure to remove unsaturated components, aromatics, sulfur compounds, etc.

As the low molecular weight hydrocarbon resin, one disclosed in Japanese Patent KOKAI Publication No. 160858/1990 and the like are used.

The above exemplified melt flow improvers may be used independently or as a mixture of two or more of them.

To carry out the present invention, if desired, various additives such as an antioxidant, a heat stabilizer, a light stabilizer, a flame retardant, a lubricant, an antistatic agent, an inorganic or organic colorant, a rust preventive, a crosslinking agent, a foaming agent, a fluorescent agent, a surface smoothing agent, a surface gloss improver and the like can be added to the resin composition during the preparation of the composition or during the processing after the preparation of the composition.

The flame retardant is explained further in detail. The flame retardant useful in the present invention includes a group of the compounds well known to those skilled in the art.

In general, among the flame retardant, there is used a compound comprising an element which can impart flame retardancy to the composition such as bromine, chlorine, antimony, phosphorus and nitrogen as disclosed in Japanese Patent KOKAI Publication No. 160856/1990. For example, a halogen-containing organic compound, antimony oxide, a mixture of antimony oxide and the halogen-containing compound, a mixture of antimony oxide and a phosphorus compound, phosphorus or a phosphorus compound, a mixture of the halogen-containing compound and the phosphorous compound or a compound having a phosphorus-nitrogen bond, and a mixture of two or more of such compounds are used.

There is no limitation on a process for preparing the thermoplastic resin composition of the present invention, and any conventional process can be used. For example, a process comprising mixing the components in the form of solutions, and evaporating a solvent or precipitating the components in a non-solvent liquid is effective. From the industrial view point, preferably the components are kneaded in molten states. For melt kneading, any kneading machine such as a single or twin screw extruder, various kneaders and the like is used. In particular, a twin screw kneader is preferred.

For kneading, the components are preferably uniformly premixed using a tumbling mixer or a Henschel mixer. Optionally the components are separately charged after metering to the kneading machine without premixing.

The kneaded resin composition is molded by a conventional molding method such as injection molding, extrusion molding and the like. The component may be dry blended during injection molding or extrusion molding without pre-kneading, kneaded during the melt processing step and then directly molded to produce the molded article.

In the present invention, there is no limitation on a sequence of kneading the components. The components (A), (B) and (C) are simultaneously kneaded, or the components (A) and (B) are kneaded first and then the component (C) is kneaded. Other kneading sequence may be employed.

PREFERRED EMBODIMENTS OF THE INVENTION

The present invention will be illustrated by the following examples, which are only for explanation purpose and do not limit the scope of the present invention.

In the examples, the properties are measured as follows:

A temperature of deflection under load (TDUL) was measured according to JIS K 7207 and a notched Izod impact strength (at a thickness of 6.4 mm) was measured according to JIS K 7110.

A reduced viscosity ($\eta_{sp}/C$) of the polyphenylene ether was measured with a 0.5 g/dl solution in chloroform at 23° C.

A melt flow index (MI) of the polypropylene was measured according to JIS K 6758 at 230° C. under a load of 2.16 kg.

Measurement of the physical properties was effected on a molded article which was prepared by kneading the resin composition using a twin screw extruder (PCM-30 type manufactured by Ikegai Tekko Co., Ltd.) at a cylinder temperature of 260° to 280° C. and injection molding the composition using an injection molding machine (IS 150E-V type manufactured by Toshiba Machine Co., Ltd.) at a molding temperature of 260° to 280° C. and a mold temperature of 70° C. A flexural modulus was measured according to ASTM D790.

Appearance of the injection molded article was evaluated according to the following criteria:

O: The appearance is beautiful and few flow mark or little color tone change is observed.

X: Flow marks and color tone change are observed on the surface of the molded article.

PREPARATION AND ANALYSIS OF THE MODIFIED

POLYPHENYLENE ETHER AS THE COMPONENT(A)

Number average molecular weight

A number average molecular weight was measured by the gel permeation chromatography (hereinafter referred to as "GPC") according to a conventional manner.

Measurement of amounts of amines in the raw material polyphenylene ether and the modified polyphenylene ether Nitrogen content in the whole amine About one gram of a sample was weighed and dissolved in chloroform (50 cc). After the addition of acetic acid (5 cc), the solution was analyzed by potentiometric titration using a potentiometric titration apparatus AT-310 (manufactured by Kyoto Electronics, Co., Ltd.) (a glass-calomel electrode, a titrant: 0.1M perchloric acid (acetic acid solution)), and the nitrogen content in the whole amine was calculated according to the following equation:

$$N_T=0.0014 \times A \times C_1 \times 100/S$$

$N_T$: Nitrogen content in the whole amine (%)
A: Titer (cc)
S: Sample amount (g)
$C_1$: Concentration of the perchloric acid solution (mole/l)

Nitrogen content in the tertiary amine

About one gram of a sample was weighed and dissolved in chloroform (50 cc). Acetic anhydride (5 cc) was added to the solution, the solution was kept standing, and then acetic acid (5 cc) was added. Thereafter, the potentiometric titration was carried out in the same way as in the titration of the nitrogen content in the whole amine, and the nitrogen content in the tertiary amine was calculated according to the following equation:

$$N_3=0.0014 \times B \times C_2 \times 100/S$$

$N_3$: Nitrogen content in the tertiary amine (%)
B: Titer (cc)
S: Sample amount (g)
$C_2$: Concentration of the perchloric acid solution (mole/l)

Nitrogen content in the secondary amine

About one gram of a sample was weighed and dissolved in chloroform (50 cc). Salicyl aldehyde (0.5 cc) was added to the solution and the solution is kept standing. Thereafter, the potentiometric titration was carried out in the same way as in the titration of the nitrogen content in the whole amine except that a 0.1 mole/l solution of hydrochloric acid in 2-propanol was used as a titrant. First, the nitrogen content $N_{2,3}$ in the sample (secondary amine+tertiary amine) was calculated according to the following equation:

$$N_{2,3}=0.014 \times C \times D \times 100/S$$

C: Concentration of hydrochloric acid for titration (mole/l)
D: Titer (cc)
S: Sample amount (g)

Thereafter, the nitrogen content $N_2$ (%) of the secondary amine contained in the sample was calculated according to the following equation:

$$N_2=N_{2,3}-N_3$$

Nitrogen content in the primary amine

The nitrogen content $N_1$ (%) of the primary amine contained in the sample was calculated according to the following equation:

$$N_1=N_T-N_2-N_3$$

NMR measurement

Using a spectrometer AMX 600 (manufactured by Brucker), the NMR measurement is carried out at 600.14 MHz of the resonance frequency for $^1H$, and 150.92 MHz of the resonance frequency for $^{13}C$.

A sample is dissolved in $CDCl_3$ and the measuring temperature is 40° C.

Chemical shifts are calculated with the peak of $CHCl_3$ being 7.24 ppm in the case of H-NMR and with the peak of $CDCl_3$ being 77.1 ppm in the case of $^{13}C$-NMR.

The peaks of R-1 were assigned according to those described in Macromolecules, 23, 1318–1329 (1990).

Reference Example 1

In a jacketed 10 liter autoclave equipped with a stirrer, a thermometer, a condenser and an air inlet tube which reached the bottom of the autoclave, xylene (3420 g), methanol (1366 g), 2,6-dimethylphenol (1222 g, 10.02 moles) and sodium hydroxide (24 g) were charged to form a homogeneous solution. Then, the solution was added to a solution of diethanolamine (33.8 g), di-n-butylamine (27.7 g, 0.233 mole corresponding to 0.0233 mole per one mole of 2,6-dimethylphenol) and manganese chloride tetrahydrate (0.99 g) dissolved in methanol (100 g).

While vigorously stirring the content, an air was bubbled through the content at 5 liter/min. The reaction temperature and pressure were maintained at 35° C. and 9 kg/cm$^2$, respectively. After 7 hours from the start of air bubbling, the air supply was stopped, and the reaction mixture was poured in a mixture of acetic acid (66 g) and methanol (4900 g). The resulting slurry was filtrated under reduced pressure to isolate a polyphenylene ether in a wet state.

After the isolated polyphenylene ether was washed with methanol (7200 g), it was dried at 150° C. under reduced pressure overnight to obtain the dried polyphenylene ether (1160 g).

The polymerization was carried out in two batches to obtain 2320 g of the dried polyphenylene ether in total.

The polyphenylene ether had a number average molecular weight of 6000 and a number average polymerization degree of 50. This polyphenylene ether will be referred to as "R-1".

The nitrogen contents of various amines in R-1 are shown in Table 1. From these contents, it is seen that 0.47% of the methyl groups at the 2- and 6-positions of the polyphenylene ether were substituted by the tertiary dibutylamino groups.

Reference Example 2

The polyphenylene ether R-1 (100 parts by weight), a radical polymerization initiator (Sunperox T0, a trade name of Sanken Kako Co., Ltd.) (0.2 part by weight), an antioxidant (Irganox 1330, a trade name) (0.3 part by weight) and 2,6-di-tert.-butyl-4-methylphenol (0.2 part by weight) were mixed in a Henschel mixer, and kneaded using a twin screw extruder PCM-30 (manufactured by Ikegai Tekko Co., Ltd.) by charging it in a hopper which had been kept under a nitrogen atmosphere, at a cylinder temperature of 273° C. at a screw rotation of 80 rpm while venting. The obtained pellets were dissolved in chloroform and reprecipitated in methanol and dried. This modified polyphenylene ether had a number average molecular weight of 6800 and a number average polymerization degree of 56.7. This modified polyphenylene ether will be referred to as "A-1".

The nitrogen contents of various amines in A-1 are shown in Table 1. Comparing with the raw material polyphenylene ether, it is seen that the modified polyphenylene having the greatly decreased amount of tertiary amine and the greatly increased amount of primary amine was obtained.

TABLE 1

Results of quantitative analysis of nitrogen in the polyphenylene ether and modified polyphenylene ether

| Sample | Nitrogen contents (%) | | | |
| --- | --- | --- | --- | --- |
|  | $N_T$ | $N_1$ | $N_2$ | $N_3$ |
| R-1 | 0.11 | <0.01 | <0.01 | 0.11 |
| A-1 | 0.10 | 0.08 | <0.01 | 0.02 |

From the above results, it is seen that about 70% of the dibutylamino groups bonded to the methyl groups were changed to the amino groups (primary amine).

Figure 1:
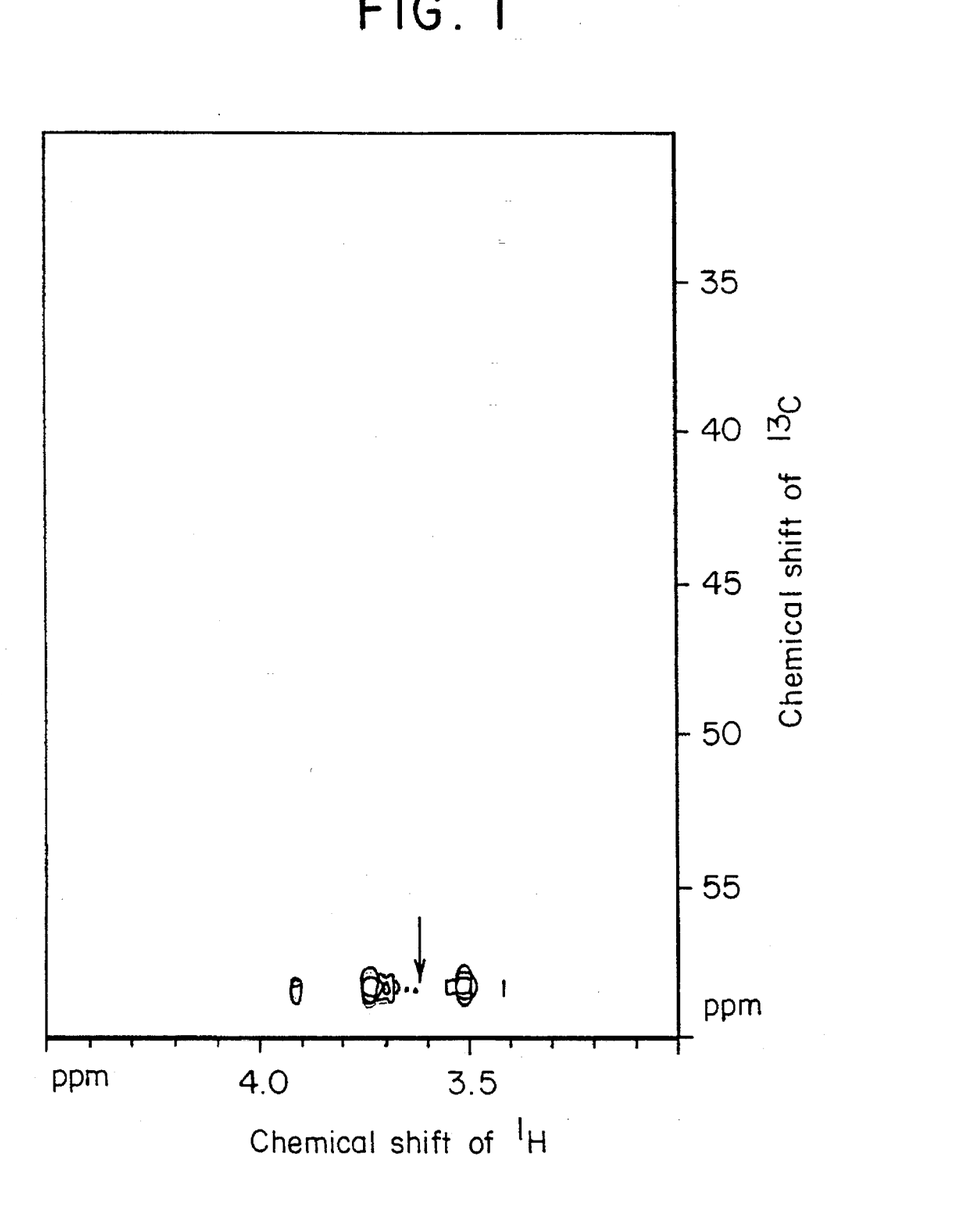
FIG. 1 is a two-dimensional HMQC NMR spectrum of the polyphenylene ether (R-1).
Figure 2:
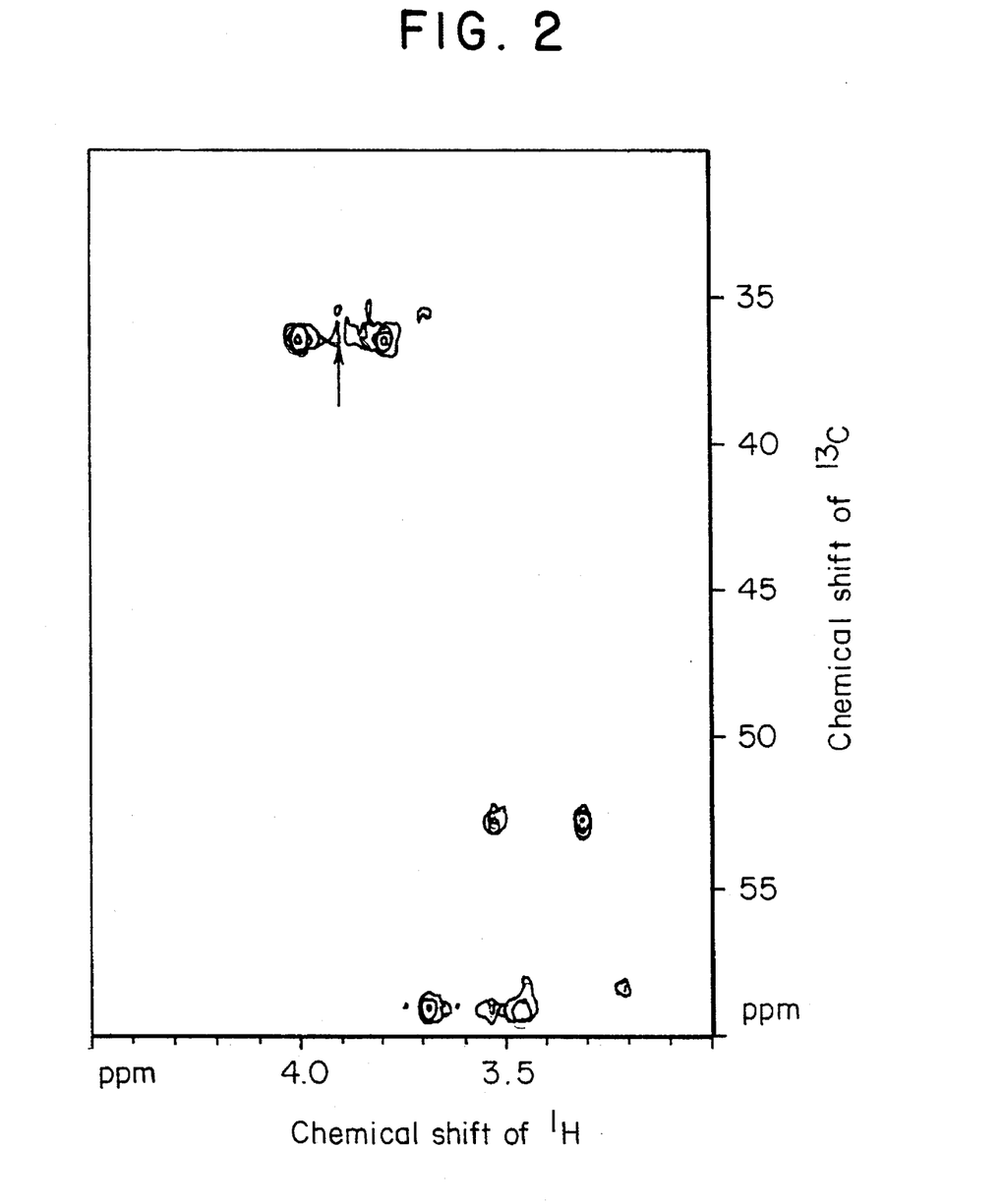
FIG. 2 is a two-dimensional HMQC NMR spectrum of the polyphenylene ether (A-1).

The two dimensional HMQC NMR spectra of R-1 and A-1 are shown in FIGS. 1 and 2, respectively.

In FIG. 1 the ordinate and the abscissa represent the chemical shifts of $^{13}$C and $^{1}$H, respectively.

In this spectrum, since decoupling of $^{13}$C was not effected during measurement, one signal was observed as two peaks split in the $^{1}$H axis direction.

The $^{13}$C-NMR chemical shift of the signal was given at the peak position, and the 1H-NMR chemical shift was given as the middle point between the two split peak positions, which is shown by the arrow.

In FIG. 2, the ordinate and the abscissa represent the chemical shifts of $^{13}$C and $^{1}$H, respectively.

In this spectrum, since decoupling of $^{13}$C was not effected during measurement, one signal was observed as two peaks split in the $^{1}$H axis direction.

The $^{13}$C-NMR chemical shift of the signal was given at the peak position, and the 1H-NMR chemical shift was given as the middle point between the two split peak positions, which is shown by the arrow.

The assignments of the major peaks are as follows:

In the two dimensional HMQC NMR spectrum of R-1, the signal having the chemical shifts of $^{13}$C:58.1 ppm and $^{1}$H:3.62 ppm is assigned to the carbon and hydrogen atoms, respectively of the methylene group at the 2- or 6-position of the phenylene group in the polyphenylene ether to which the dibutylamine is boned according to Macromolecules, 23, 1318 (1990). The intensity of this signal greatly decreased in A-1, while the new signal having the chemical shifts of $^{13}$C:36.3 ppm and $^{1}$H:3.89 ppm appears. It is known that the chemical shift of a carbon atom of a methylene group in a benzyl group to which a primary amine is bonded is 39.4 ppm according to Phytochem., 18, 1547 (1979), and that the chemical shift of a hydrogen atom of the methylene group in the benzyl group to which the primary amine is bonded is 3.9 ppm according to Aldrich Library of NMR Spectra, II, 1066 (1983). Accordingly, the signal having the chemical shifts of $^{13}$C:36.3 ppm and $^{1}$H:3.89 ppm is assigned to the carbon atom and hydrogen atom, respectively of the methylene group at the 2- or 6-position of the phenylene group of polyphenylene ether to which the primary amine is bonded.

These results coincide with the above results of titration analysis of the amino groups.

MODIFIED POLYOLEFIN AS THE COMPONENT (B)

(i) To Polypropylene H 501 (a trade name of Sumitomo Chemical Co., Ltd.; MI=3.5) (100 parts by weight), maleic anhydride (2.2 parts by weight) and Per-butyl PV (a trade name of Nippon Oil and Fat Co., Ltd.) (0.1 part by weight) were mixed together with a stabilizer by a Henschel mixer. Then, it was pelletized using a twin screw extruder (PCM-30 manufactured by Ikegai Tekko Co., Ltd.) at a cylinder temperature of 270° C. to obtain a modified polypropylene, which will be referred to as "B-1".

(ii) To Polypropylene AH 561 (a trade name of Sumitomo Chemical Co., Ltd.; MI=3.0) (100 parts by weight), maleic anhydride (5.2 parts by weight), styrene (1.8 parts by weight) and a radical polymerization initiator (Sunperox T0, a trade name of Sanken Kako Co., Ltd.) (0.2 part by weight) were mixed together with a stabilizer by a Henschel mixer. Then, it was pelletized using a twin screw extruder (PCM-30 manufactured by Ikegai Tekko Co., Ltd.) at a cylinder temperature of 260° C. to obtain a modified polypropylene, which will be referred to as "B-2".

RUBBER LIKE MATERIAL AS THE COMPONENT (C)

C-1: A styrene-butadiene-styrene block copolymer, Clayton G 1650 (a trade name of Shell Chemical Co., Ltd.)

C-2: An ethylene-propylene-diene copolymer rubber modified with maleic anhydride and styrene Examples 1–6 and Comparative Examples 1–4

Components were compounded and kneaded in a composition shown in Tables 2 and 3, and the properties were measured. The results are shown in Tables 2 and 3.

rior and exterior parts such as a bumper, a glove box, a console box, a braking oil reservoir, a radiator grill, a cooling fan, a lump housing, an air cleaner, an instrument panel, a fender, a door trim, a rear end trim, a door panel, a wheel covering, a side protector, an air intake, a garnish, a trunk lid, a bonnet, a sirocco fan, a roof and the like.

In addition, the resin composition of the present invention can be used as a mechanical part which is required to have heat resistance.

What is claimed is:

1. A thermoplastic resin composition comprising

TABLE 2

| Example No. | Composition (parts by weight) | | | | | TDUL (°C.) Load: 4.6 kg | Tensile test | | Flexural modulus ($kg/cm^2$) | Izod impact strength (kg.cm/cm) | Appearance |
|---|---|---|---|---|---|---|---|---|---|---|---|
| | Component (A) | | Component (B) | | Component (C) | | Stress at break ($kg/cm^2$) | Elongation (%) | | | |
| | Mod. PPE | Unmod. PPE | Mod. PP | Unmod. PP*[1] | Rubber like material | | | | | | |
| E. 1 | A-1 (33) | — | B-1 (67) | — | — | 143 | 630 | >500 | 19500 | 9 | O |
| C. 1 | — | R-1 (33) | B-1 (67) | — | — | 127 | 450 | 390 | 13300 | 3 | X |
| C. 2 | A-1 (33) | — | — | 67 | — | 123 | 370 | 330 | 12700 | 4 | X |
| C. 3 | — | R-1 (33) | — | 67 | — | 116 | 280 | 270 | 11900 | 4 | X |
| E. 2 | A-1 (11) | R-1 (9) | B-1 (43) | 37 | — | 127 | 530 | >500 | 16200 | 7 | O |
| E. 3 | A-1 (11) | R-1 (9) | B-1 (43) | 37 | C-1 (18) | 122 | 480 | >500 | 13500 | 13 | O |

Note:
Polypropylene H 501 (a trade name of Sumitomo Chemical Co., Ltd.).

TABLE 3

| Example No. | Composition (parts by weight) | | | | | | TDUL (°C.) Load: 4.6 kg | Tensile test | | Izod impact strength (kg.cm/cm) | Appearance |
|---|---|---|---|---|---|---|---|---|---|---|---|
| | Component (A) | | Component (B) | | Component (C) | Other component | | Stress at break ($kg/cm^2$) | Elongation (%) | | |
| | Mod. PPE | Unmod. PPE | Mod. PP | Unmod. PP*[1] | Rubber like material | | | | | | |
| E. 4 | A-1 (43) | — | B-2 (32) | 15 | — | — | 151 | 690 | 480 | 18 | O |
| E. 5 | A-1 (43) | — | B-2 (32) | 15 | C-2 (27) | — | 140 | 530 | >500 | 29 | O |
| E. 6 | A-1 (43) | — | B-2 (32) | 15 | — | 5*[2] | 155 | 750 | 430 | 17 | O |
| C. 4 | — | R-1 (43) | — | 47 | — | — | 134 | 470 | 290 | 11 | X |

Note:
*[1] Polypropylene AH561 (a trade name of Sumitomo Chemical Co., Ltd.).
*[2] Talc (average particle size: 2.9 μm, aspect ratio: 6).

The thermoplastic resin composition of the present invention is excellent in heat resistance, melt flowability, processability, chemical resistance, impact resistance, appearance and gloss. Using such good properties, it is used in the form of a molded article, a sheet, a tube, a film, a fiber, a laminate, or a coating material, by injection molding or extrusion molding.

In particular, the resin composition of the present invention is used for producing automobile parts including inte- (A) 1 to 99% by weight of a modified polyphenylene ether comprising repeating units of the formula (1):

(1)

wherein $R_1$ and $R_2$ are, independently from each other, a hydrogen atom or a hydrocarbon group having 1 to 20 carbon atoms and having a number average polymerization degree of 20 to 1200, in which 0.02/X to 1/X of methyl groups at the 2- and/or 6-positions of phenylene group are substituted by an aminomethyl group wherein X is a number average polymerization degree, and (B) 99 to 1% by weight of a polyolefin which is modified with a compound having a functional group reactive with an amino group in a molecule.

2. The thermoplastic resin composition according to claim 1, wherein said polyolefin is polypropylene.

3. The thermoplastic resin composition according to claim 1, wherein said functional group reactive with the amino group is an unsaturated dicarboxyl anhydride group.

4. The thermoplastic resin composition according to claim 1, which further comprises (C) a rubber like material in an amount of 1 to 100 parts by weight per 100 parts by weight of the total weight of said modified polyphenylene ether (A) and said polyolefin (B).

5. The thermoplastic resin composition according to claim 4, wherein said polyolefin is polypropylene.

6. The thermoplastic resin composition according to claim 4, wherein said functional group reactive with the amino group is an unsaturated dicarboxyl anhydride group.

7. The thermoplastic resin composition according to claim 1, wherein said polyolefin is polypropylene, wherein said functional group reactive with the amino group is an unsaturated dicarboxyl anhydride group, and wherein said composition further comprises (C) a rubber like material in an amount of 1 to 100 parts by weight per 100 parts by weight of the total weight of said modified polyphenylene ether (A) and said polyolefin (B).

8. The thermoplastic resin composition according to claim 1, wherein component (A) is present in an amount of 1 to 80% by weight and component (B) is present in an amount of 99 to 20% by weight.

9. The thermoplastic resin composition according to claim 1, wherein component (A) is present in an amount of 1 to 70% by weight and component (B) is present in an amount of 99 to 30% by weight.

10. The thermoplastic resin composition according to claim 1, wherein said modified polyphenylene ether has a number average polymerization degree of 30 to 1,000.

* * * * *